No. 734,458. Patented July 21, 1903.

UNITED STATES PATENT OFFICE.

ERNST WILHELM ENGELS, OF DUSSELDORF, GERMANY.

PROCESS OF MAKING BRICKS OR BODIES FOR REFRACTORY LININGS OR OTHER USES AND THE PRODUCT THEREOF.

SPECIFICATION forming part of Letters Patent No. 734,458, dated July 21, 1903.

Original application filed March 8, 1900, Serial No. 7,817. Divided and this application filed February 11, 1903. Serial No. 142,927. (No specimens.)

*To all whom it may concern:*

Be it known that I, ERNST WILHELM ENGELS, a citizen of Germany, residing at Dusseldorf, Germany, have invented certain new and useful Improvements in Processes of Making Bricks or Bodies for Refractory Linings and other Uses and the Product Thereof, of which the following is a specification.

This invention relates to the processes of making bricks or bodies for refractory linings and other uses and the product thereof; and the objects and advantages of the same will appear hereinafter.

This application is a division and continuation of my original application filed March 8, 1900, Serial No. 7,817.

It has been proposed heretofore to use carbid of silicon or carborundum mixed with a binding agent, which in a plastic mass is molded into suitable form and subsequently dried to produce a homogeneous structure of that material.

So far as I am aware, it is new in the present invention to employ carborundum as a coating for a less refractory body, exemplified by brick, and applied in the manner to be hereinafter stated.

It is the main object of the present invention to provide a refractory coating or covering of a homogeneous nature for fire-bricks or other refractory bodies which is so applied to the brick or body as that after the firing or burning of the brick the coating or covering will be highly tenacious—that is to say, it adheres so firmly to and is so incorporated in the surface of the brick or body that it will not readily crack or separate therefrom. This is due to the physical qualities of the carborundum coating, and it is extremely strong and not brittle.

Carborundum in the form of a coating or covering in accordance with the present invention efficiently protects the inner core, is absolutely proof against and excludes the pyrochemical action of gases, it is not influenced injuriously by changes of temperature, and it is insensible to flying ashes, and therefore cannot form an objectionable slag, and in consequence of these advantages carbid of silicon or carborundum as applied in the present process to form a coating is the ideal, as well as the most practical, material for this purpose.

For the carrying out of the present process the plastic or soft material of which the body of the fire-brick or other refractory article is produced is first formed up in a mold or in any other suitable manner to produce the plates or articles to be coated, and then with the surface of the plate, brick, or other article there is intimately united before burning a coating or covering of carborundum, either by rubbing the carbid in or by direct pressure, thereby causing the carbid to adhere to and be impressed into the surface without resorting to any binding material. It is evident that no binding material is necessitated, because the finely-divided carbid is applied to the surface while the brick or relatively less refractory porous body is in a plastic condition, the fine particles of carbid being stuck onto the surface by the rubbing or pressing action.

The present invention takes advantage of the physical condition of the carborundum, which has not as yet been recognized for this purpose—namely, the fact that much manufactured carborundum is produced in the finely-divided condition, which readily facilitates spreading it on a surface and the pressing and rubbing the same into and intimately incorporating it with the surface of the brick or other body to be coated. As compared with other fireproof materials of which I am aware carborundum can be used in a very thin layer.

The described composite brick produced before firing by the described process when it is subjected to high temperature is furnished with a refractory surface of exceeding hardness, which is intimately incorporated with the brick or body and does not readily crack or separate therefrom. Indeed the carbid seems to unite or blend with the substance of the brick, although carborundum is not known to be fusible by itself at the temperatures involved in furnaces, and it was heretofore supposed that the use of the electric arc was necessary to cause the carborundum to unite with the brick.

I am aware that it is old to mold bricks, retorts, crucibles, and other fire-ware receptacles, which have been dusted with powdered calomine, (an oxid and not a carbid,) the bricks themselves being formed of small pieces of flint and an aluminous binding material, these bricks being subjected to the heat of the kiln, in consequence of which the calomine will be fused and act as a flux on the surface of the brick. This is widely distinguished from the present invention by the fact that in the present process the carborundum is not an oxid and does not by itself fuse and form a flux, but, on the contrary, is more refractory than the brick into whose surface it is embedded. The article produced by the present invention is still more widely distinguished, because the carborundum in the surface is less fusible than the interior of the brick itself, whereas in the case of the calomine-coated articles the reverse is true.

I am also aware that it has been proposed to produce spotted or mottled effects on bricks by incorporating triassic red shale with the surface of an ordinary brick or block of clay in order that when it is subjected to the proper degree of heat the fusible portions of the shale-like substance will be melted within and on the surface of the brick, which itself does not melt, and will form the veins, spots, or protuberances that give the mottled effect; but this is not the object of the present invention. Nor does the surface coating formed with carborundum as I have described melt in any such way as does the surface of red shale described in the Lenderoth Patent No. 508,428.

I am also aware that it has been proposed to make an unburned brick or tile of a mixture of moistened hydraulic cement or sand having a face consisting of metallic powder or grains that are incorporated with the body; but here again the metallic powder or grains are relatively more fusible than the body of the material to which they are applied.

Having thus described my invention and distinguished the same from what is old prior thereto, what I claim as new, and desire to secure by Letters Patent, is—

1. The process of producing bricks or bodies for refractory furnace-linings or other uses, which consists in applying to the surface of unburned brick, while in a plastic state, carborundum, and forcing the carborundum into the surface by pressure, before firing the said brick or body, and subsequently firing or burning the said brick or body at a temperature less than that of the electric arc for producing a highly refractory surface which does not readily crack or separate from the less refractory and more fusible interior portion, substantially as described.

2. As a new product, a brick or body consisting essentially of fire-brick but having at and near one or more of its surfaces carborundum impressed and incorporated superficially into the substance of the brick itself in contradistinction to an enamel such as is formed by the electric arc.

In testimony whereof I have signed this specification in the presence of two subscribing witnesses.

ERNST WILHELM ENGELS.

Witnesses:
PETER LIEBER,
WILLIAM ESSENWEIN.